United States Patent [19]
Carr

[11] Patent Number: 5,545,871
[45] Date of Patent: Aug. 13, 1996

[54] METHOD OF MAKING A MODIFIED ELLIPTICAL GEAR

[75] Inventor: Charles F. Carr, Antioch, Calif.

[73] Assignee: Micropump, Inc., Northbrook, Ill.

[21] Appl. No.: 180,684

[22] Filed: Jan. 11, 1994

[51] Int. Cl.$^6$ .............................. B23H 9/00; B23H 7/02
[52] U.S. Cl. .................... 219/69.17; 364/474.04
[58] Field of Search ............... 74/437, 462; 418/206, 418/206 D; 219/69.17, 69.2, 69.15, 69.12; 409/11, 12; 364/474.02, 474.03, 474.25, 474.04; 475/162

[56] References Cited

U.S. PATENT DOCUMENTS

| | | | |
|---|---|---|---|
| 2,788,567 | 4/1957 | Stibitz | 74/437 |
| 2,842,977 | 7/1958 | Stibitz | 74/437 |
| 2,897,765 | 8/1959 | Kitano | 418/206 |
| 3,874,267 | 4/1975 | Schwenke | 409/12 |
| 4,036,073 | 7/1977 | Kitano | 74/462 |
| 5,030,184 | 7/1991 | Rennerfelt | 475/162 |
| 5,169,292 | 12/1992 | Loubier et al. | 417/63 |
| 5,170,677 | 11/1992 | Yonekura et al. | 74/437 |
| 5,333,974 | 8/1994 | Matsuura | 364/474.03 |

FOREIGN PATENT DOCUMENTS 921744  4/1982  U.S.S.R. .................... 219/69.17

OTHER PUBLICATIONS

Ségalat, *How Things Work*, pp. 240–243.
Cunningham, *Rediscovering the Noncircular Gear*, Machine Design, Nov. 1, 1973, pp. 80–83.

*Primary Examiner*—Geoffrey S. Evans
*Attorney, Agent, or Firm*—Klarquist Sparkman Campbell Leigh & Whinston, LLP

[57] ABSTRACT

A modified elliptical gear defined by a modified elliptical shape having perpendicularly disposed major and minor axes, and bulged portions projecting outwardly beyond the contour of a true ellipse in peripheral regions between the major and minor axes. A computer is preferably used to rotate a simulated hobbing rack having a row of hobbing teeth around the modified elliptical shape. The outline of the hobbing rack is traced at selected positions during the rack rotation to produce a profile of a modified elliptical gear with projecting gear teeth. A topping shape is superimposed upon the gear profile to selectively top the gear teeth. The modified elliptical gear profile is transmitted to a machining device operable to produce a modified elliptical gear.

16 Claims, 12 Drawing Sheets

```
(DEFUN C:ELHOB()
  (SETQ SS1 (SSADD) SS2 (SSADD) SS3 (SSADD) CTR NIL REFD NIL RES NIL
    ITER NIL COUNT NIL DELL NIL DELL0 NIL EXPLD NIL OFFSET NIL ADSHFT NIL
    MAJOR 1 MINOR NIL DST 0 Y0 NIL X0 NIL X1 NIL X2 NIL Y1 NIL Y2 NIL
    EDXN NIL ERR NIL SHIFT 0
    HOBFIL "ZZZ" DP NIL.
  ); end setq
  (WHILE (OR (NOT DP)
          (AND (NOT(FINDFILE(STRCAT HOBFIL ".DWG")))
               (NOT(TBLSEARCH "BLOCK" HOBFIL))
          ); ENDAND
      ); ENDOR
      (IF DP (PROMPT"\nFILE NOT FOUND . . ."))
      (SETQ DP NIL HOBFIL "ZZZ"
            DP (GETINT "\nDIAMETRAL PITCH? . . .")
      ); END SETQ
      (IF DP (SETQ HOBFIL (STRCAT (ITOA DP) "DPHOB")))
  ); END WHILE
  (SETQ NT (GETREAL "\nNUMBER OF TEETH? . . .")
    OD (/ (GETREAL "\nMAJOR OUTSIDE DIAMETER? . . <0 for none> ") 2)
    RATIO (GETREAL "\nRATIO OF DIAMETERS MAJOR/MINOR? . . .")
    CIRC (* PI (/ NT DP))
    OFFSET (GETREAL "\nHOB OFFSET FROM PITCH ELLIPSE <0> . .")
    ADSHFT (GETREAL "\nHOB SHIFT FOR TOOTH ORIENTATION <0> . .")
    CTR (GETPOINT "\nSELECT CENTER OF GEAR BLANK . .")
    X0 (CAR CTR)
    Y0 (CADR CTR)
    RES (/ (* 2 PI) 360)
    ITER0 361
    COUNT0 1
    MARK1 (ENTLAST)
    ANG1 0
  ) ; END SETQ
  (IF (NOT OD) (SETQ OD 1))
  (IF (NOT (SETQ ERR (GETREAL "\nELLIPSE ERROR . . . <0>? "))) (SETQ ERR 0))
  (SETQ ERRATIO (/ ERR OD))
  (IF (NOT OFFSET) (SETQ OFFSET 0))
  (IF (NOT ADSHFT) (SETQ ADSHFT (* 0.25 (/ PI DP)))
         (SETQ ADSHFT (+ ADSHFT (* 0.25 (/ PI DP)))))
```

Fig. 7a

```
); ENDIF
(INITGET "Yes No")
(SETQ EXPLD (GETKWORD "CREATE FINISHED GEAR? Yes <No> : ")
    X1 (+ X0 OD) Y1 Y0 P1 (LIST 10 X1 Y1)) ; END SETQ
(WHILE (< COUNT0 ITER0)  ; FIND CIRCUMFRENCE OF ELLIPSE 1 in X RATIO
   (SETQ ANG2 (* COUNT0 RES)
       X2 (+ (* OD (COS ANG2)) X0)
       Y2 (+ (* (/ OD RATIO) (SIN ANG2)) Y0)
       P1 (CONS 10 (CDR P1))
       P2 (LIST X2 Y2)
       P2 (CONS 11 (POLAR P2 ANG2 (ABS (* ERR (EXPT (SIN (* 2 ANG2))2)))))
       DST (+ DST (DISTANCE (CDR P1) (CDR P2)))
   ) ;END SETQ
   (IF (/= OD 1) (ENTMAKE (LIST '(0 . "LINE") P1 P2)))
   (SETQ P1 P2 COUNT0 (1+ COUNT0))
) ; END WHILE
;
; ELLIPSE DRAWN, DST IS THE CIRCUMFERENCE OF THE OD ELLIPSE
;
; BEGIN FIRST RACK INSERTION
;
(SETQ MAJOR (* CIRC (/ OD DST)) ; SET MAJOR RADIUS
     MINOR (/ MAJOR RATIO)
     INSANG (GETINT "\nANGLE BETWEEN ROTATIONS ? . . ")
     ENDANG (1+ (/ 360 INSANG))
     INSCNT 1
     COUNT0 1
     DST 0
     ITER0 (* INSANG ENDANG)
     X1 X0
     Y1 (- Y0 MINOR OFFSET)
     ANG0 (* 3 (/ PI 2))
     SHIFT (* 3 (/ PI DP))
     INSPT (LIST (+ X1 SHIFT ADSHFT) Y1 0)
);END SETQ
(SETVAR "CMDECHO" 0)
(COMMAND "INSERT" HOBFIL INSPT "" "" "")
(SETQ EDXN (ENTLAST) EDX (ENTGET EDXN))
(ENTDEL EDXN) ; DELETE FIRST RACK INSERTED
```

Fig. 7b

```
(SETQ X1 0
    Y1 (- 0 MINOR)
    P1 (LIST X1 Y1))
(WHILE (< COUNT0 ITER0) ;
  (SETQ ANG2 (- ANG0 (* COUNT0 RES))
    X2 (* MAJOR (COS ANG2))
    Y2 (* MINOR (SIN ANG2))
    P2 (LIST X2 Y2)
    P2 (POLAR P2 ANG2 (ABS (* (* ERRATIO MAJOR) (EXPT(SIN (* 2 ANG2))2))))
    DST (+ DST (DISTANCE P1 P2))
) ;END SETQ
(IF (= COUNT0 (* INSANG INSCNT))
    (PROGN
      (SETQ ANG3 (- ANG2 RES)
        X3 (* MAJOR (COS ANG3))
        Y3 (* MINOR (SIN ANG3))
        P3 (LIST X3 Y3)
        P3 (POLAR P3 ANG3 (ABS (* (* ERRATIO MAJOR) (EXPT(SIN (* 2 ANG3))2))))
        P2X (LIST (+ X0 (CAR P2)) (+ Y0 (CADR P2)) 0)
        DSTX (+ DST SHIFT ADSHFT)
      ); end setq
      (WHILE (>= DSTX (* 2 SHIFT)) (SETQ DSTX (- DSTX SHIFT)))
      (SETQ ANG (- (ANGLE P1 P3) PI)
        INSPT (POLAR P2X ANG DSTX)
        INSPT (POLAR INSPT (- ANG (/ PI 2)) OFFSET)
        ED (SUBST (CONS 10 INSPT) (ASSOC 10 EDX) EDX)
        ED (SUBST (CONS 50 ANG) (ASSOC 50 ED) ED)
        INSCNT (1+ INSCNT)
      ); END SETQ
      (ENTMAKE ED)
      (IF (= EXPLD "Yes")
        (PROGN
          (SETQ SS2 (SSADD(ENTLAST))
            SS1 (SSADD)
            MARK2 (ENTLAST)
          );END SETQ
          (COMMAND "EXPLODE" SS2)
          (WHILE (SETQ MARK2 (ENTNEXT MARK2))
            (SSADD MARK2 SS1)
```

Fig. 7c

```
                    ); ENDWHILE
                    (SETQ ITER (SSLENGTH SS1)
                          COUNT 0
                    ); END SETQ
                    (WHILE (< COUNT ITER)
                        (SETQ EN1 (SSNAME SS1 COUNT)
                              ED1 (ENTGET EN1)
                          P10 (LIST (CADR(ASSOC 10 ED1)) (CADDR(ASSOC 10 ED1)))
                          P20 (LIST (CADR(ASSOC 11 ED1)) (CADDR(ASSOC 11 ED1)))
                              ANG10 (ANGLE CTR P10)
                              ANG20 (ANGLE CTR P20)
                              X10 (+ X0 (* OD (COS ANG10)))
                              Y10 (+ Y0 (* (/ OD RATIO) (SIN ANG10)))
                              P30 (LIST X10 Y10)
                              X10 (+ X0 (* OD (COS ANG20)))
                              Y10 (+ Y0 (* (/ OD RATIO) (SIN ANG20)))
                              P40 (LIST X10 Y10)
                        ); END SETQ
                        (IF(OR (AND (> ANG10 (/ PI 2)) (> ANG20 (/ PI 2)))
                              (AND(> (DISTANCE CTR P10) (DISTANCE CTR P30))
                                  (> (DISTANCE CTR P20) (DISTANCE CTR P40))
                              ); END AND
                          ); END OR
                          (PROGN
                              (ENTDEL EN1)
                              (SSDEL EN1 SS1)
                              (SETQ ITER (1- ITER))
                          ); END PROGN , THEN
                          (PROGN
                              (SETQ COUNT (1+ COUNT)); ELSE
                              (REDRAW EN1 3)
                          ); END PROGN
                      ) ) ; END IF, WHILE
                    )) ; END PROGN, ENDIF
                  )); END PROGN, ENDIF
                  (SETQ P1 P2 COUNT0 (1+ COUNT0)
                  ) ;END SETQ
              ); END WHILE
              (SETVAR "CMDECHO" 1)
```

Fig. 7d

;
; BEGIN FOLLOW LEFT OPERATION
;
(IF (= EXPLD "Yes")
  (PROGN
    (SETQ P1 (LIST X0 Y0)
        P2 (LIST X0 (+ (/ OD RATIO) Y0))
        ED1 (LIST '(0 . "LINE") (CONS 10 P1) (CONS 11 P2))
    );ENDSETQ
    (ENTMAKE ED1)
    (SETQ MARKER MARK1
        SS1 (SSADD)
    ); END SETQ
    (WHILE (SETQ MARKER (ENTNEXT MARKER))
        (SSADD MARKER SS1)
    );  END WHILE
    (SETQ ITER (SSLENGTH SS1)
        P1 (LIST X0 Y0)
        P2 (LIST (+ X0 OD 0.01) Y0 )
        ED1 (LIST '(0 . "LINE") (CONS 10 P1) (CONS 11 P2))
        INSCNT 0 REFD NIL COUNT 0 ENP NIL
        DST 0 CP (/ SHIFT 3) SS2 (SSADD)
    );ENDSETQ
    (ENTMAKE ED1)
    (WHILE (/= INSCNT 2)
      (IF (= INSCNT 0)
        (SETQ EN1 (ENTLAST) INSCNT 1); THEN
        (SETQ ENP EN1 EN1 EN2 P1 P2 P2 P4); ELSE
      );ENDIF
      (SETQ COUNT 0 ENL NIL)
      ;
      ; CREATE/MODIFY SS2
      ;
      (IF (= DST 0)
        (PROGN
          (WHILE (< COUNT ITER)
            (SETQ EN (SSNAME SS1 COUNT)
                ED (ENTGET EN)
            ); END SETQ

Fig. 7e

```
(IF(OR(< (DISTANCE (LIST(CADR(ASSOC 10 ED))(CADDR(ASSOC 10 ED))) P2) (* 1.5
CP))
        (< (DISTANCE (LIST(CADR(ASSOC 11 ED))(CADDR(ASSOC 11 ED))) P2) (* 1.5 CP))
                ) ; END OR
                (PROGN  ; THEN
                    (IF(NOT(SSMEMB EN SS2))
                        (SSADD EN SS2)
                    ); ENDIF
                ) ; end progn
                (PROGN  ; ELSE
                    (IF(SSMEMB EN SS2)
                        (PROGN  ; THEN
                            (SSDEL EN SS2)
                            (SSDEL EN SS1)
                            (ENTDEL EN)
                            (SETQ ITER (- ITER 1))
                        ); END PROGN
                    ); END IF
                ) ; end progn
            ) ; endif
            (SETQ COUNT (1+ COUNT))
        ) ; END WHILE
        (SETQ ITER0 (SSLENGTH SS2) COUNT 0)
    )); END PROGN, ENDIF
    (WHILE (< COUNT ITER0)
        (SETQ EN2 (SSNAME SS2 COUNT)
              ED2 (ENTGET EN2)
              P3 (LIST (CADR(ASSOC 10 ED2)) (CADDR(ASSOC 10 ED2)))
              P4 (LIST (CADR(ASSOC 11 ED2)) (CADDR(ASSOC 11 ED2)))
              COUNT (1+ COUNT)
        ); ENDSETQ
        (IF (AND (/= EN2 EN1)(/= EN2 ENP)
(/= (ATOF(RTOS(ANGLE P1 P2)2 9)) (ATOF(RTOS(ANGLE P3 P4)2 9)))
(/= (ATOF(RTOS(ANGLE P1 P2)2 9)) (ATOF(RTOS(ANGLE P4 P3)2 9)))
            (SETQ PX (INTERS P1 P2 P3 P4))
                (> (DISTANCE P1 PX) 0.000000001))
            (SETQ P2 PX ENL EN2)
        );ENDIF
    ); ENDWHILE
```

Fig. 7f

```
                (PRINC P2)
                (SETQ EN2 ENL
                    ED2 (ENTGET EN2)
                    P3 (LIST (CADR(ASSOC 10 ED2)) (CADDR(ASSOC 10 ED2)))
                    P4 (LIST (CADR(ASSOC 11 ED2)) (CADDR(ASSOC 11 ED2)))
                );END SETQ.
                (COND
                    ((< (DISTANCE P2 P3) 0.000000001)(PRINC))
                    ((< (DISTANCE P2 P4) 0.000000001)
                        (SETQ P4 P3))
                    ((SETQ ANG1 (ANGLE P1 P2))
                        (PROGN
                        (SETQ ANG2 (- (ANGLE P2 P3) ANG1)
                        )
                    (IF (< ANG2 0.0)(SETQ ANG2 (+ ANG2 (* 2 PI))))
                    (IF (< ANG2 0.0)(SETQ ANG2 (+ ANG2 (* 2 PI))))
                    (IF (< ANG2 PI)
                        (SETQ P4 P3); THEN
                )))); END IF, COND
                (SETQ ED1 (LIST '(0 . "LINE") (CONS 10 P1) (CONS 11 P2)))
                (ENTMAKE ED1)
                (SETQ DST (+ DST (DISTANCE P1 P2)))
                (IF (> DST CP) (SETQ DST 0))
                (IF (< (DISTANCE (LIST X0 Y0) P2) 0.001) (SETQ INSCNT 2))
                (PROMPT ".")
            ); END WHILE
        )); PROGN, ENDIF
    (C:SWEEP)
    (PRINC)
); END DEFUN
;
;
;
(DEFUN C:SWEEP()
    (SETQ ITER (SSLENGTH SS1)
            COUNT 1
    );END SETQ
    (WHILE (< COUNT ITER)
        (ENTDEL (SSNAME SS1 COUNT))
        (SETQ COUNT (1+ COUNT))
```

Fig. 7g

```
);END WHILE
(REDRAW)
);END DEFUN
```

Fig. 7h

METHOD OF MAKING A MODIFIED ELLIPTICAL GEAR

TECHNICAL FIELD

The present invention is directed to modified elliptical gears that may mesh in pairs, and a method for making the modified elliptical gears.

BACKGROUND INFORMATION

Elliptical gears are meshed in pairs for use in devices such as flow meters. Such elliptical gears have different major and minor axis dimensions, and may be meshed together so that each gear rotates about the elliptical gear center. For such gears to mesh continually during rotation, the gears pass through a position every 90° wherein the major axes of the gears are perpendicular to each other. For instance, in an initial position, the major axis of a first paired gear is coincident with a line connecting the centers of the two gears, and the major axis of a second paired gear is perpendicular to the center line. When the gears have rotated 90°, the major axis of the second gear is coincident with the center line, and the major axis of the first gear is perpendicular to the line.

While a pair of true elliptical gears may mesh snugly when the gears are in the initial 0° position, the meshing becomes loose when the true elliptical gears are rotated away from the initial orientation. The loose meshing is due to a gap that forms between the true elliptical gears four times during every full rotation of the gears As the gears rotate 30°–70°, 120°–160°, 210°–250°, and 300°–340° away from the initial position, the gap causes loose meshing by pulling the meshing teeth slightly apart. The gap reaches maximum values at 45°, 135°, 225°, and 315° rotation.

Loose meshing is undesirable because it inhibits the smooth rotation of the gears. Moreover, fluid may leak between the loosely meshed teeth, tending to degrade the effectiveness of true elliptical gears in flow meters and pumps.

Elliptical gears have another disadvantage in being impractical to mechanically hob. Mechanical hobbing is a simple and effective means of producing circular gears. In such hobbing, a circular gear blank is rotated about a fixed center point, while a hobbing rack with a series of cutting teeth moves transversely over the edge of the gear blank to cut teeth into the blank. Such mechanical hobbing produces precise involute-shaped gear teeth on the circular gear that snugly mesh with involute teeth on a meshed gear.

The application of mechanical hobbing to elliptical gear is problematic due to the varying radii of an ellipse. The variable radii would require the center of an elliptical gear blank to be precisely moved toward and away from the hobbing rack as the gear blank is rotated in order to properly cut teeth. Such movement would require an expensive and complicated control system.

SUMMARY OF THE INVENTION

The present invention is directed to a modified elliptical gear and a method for making such a gear. It is an object of the present invention to provide an improved elliptical gear that meshes snugly throughout rotation with an identical elliptical gear.

A further object of the invention is to provide a method for making a modified elliptical gear that permits a simulated hobbing process to be used in producing a modified elliptical gear.

Another object of the invention is to provide a method for making a modified elliptical gear with involute gear teeth.

The method for making a modified elliptical gear comprises providing a modified elliptical shape having perpendicularly disposed major and minor axes, and bulged portions projecting outwardly beyond the contour of a true elliptical shape in peripheral regions between the major and minor axes. A computer is preferably used to rotate a simulated hobbing rack having a row of hobbing teeth around the modified elliptical shape. The outline of the hobbing rack is traced at selected positions during the rack rotation to produce a contour of a modified elliptical gear with projecting gear teeth.

The modified elliptical gear contour may be preferably transmitted to machining means that cuts a modified elliptical gear from a gear blank, or cuts a form within which such a gear may be cast.

DESCRIPTION OF A PREFERRED EMBODIMENT

Figure 1A:
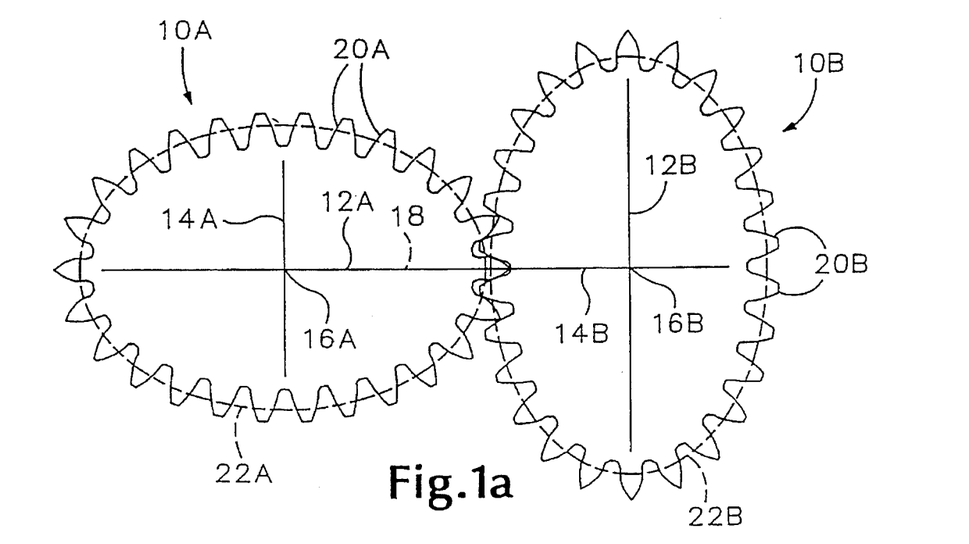
FIG. 1a is a computer-generated view of a meshed pair of modified elliptical gears in accordance with an embodiment of the invention, showing the meshing of the gears in a 0° initial rotation position wherein the major axes of the gears are perpendicular.
Figure 1B:
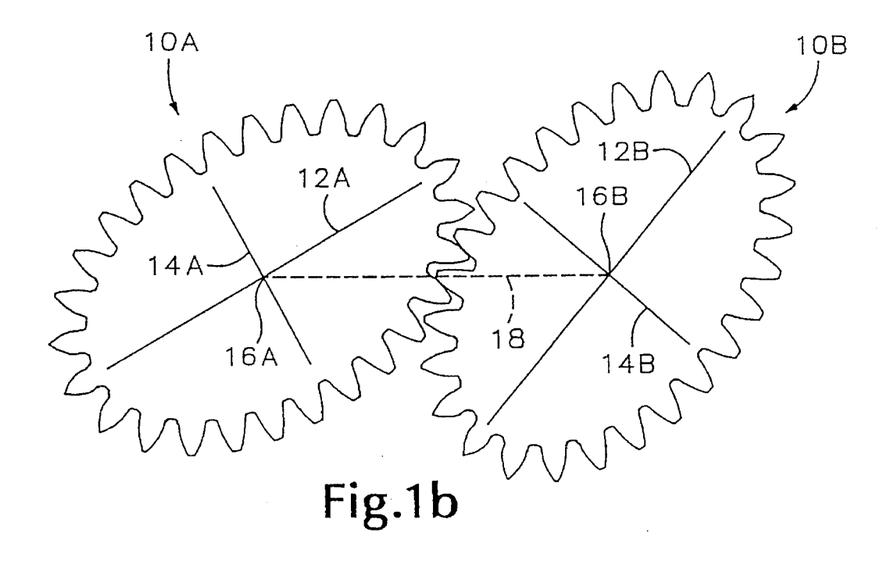
FIG. 1b is the meshed pair of modified elliptical gears of FIG. 1a, showing the snug meshing of the gears when the gears are rotated to a position 40° from the initial position.

A pair of modified elliptical gears in accordance with a preferred embodiment of the present invention is designated in FIGS. 1a and 1b with reference numerals 10A and 10B.

Each modified elliptical gear 10A, 10B respectively has a major axis 12A, 12B and a minor axis 14A, 14B. The pair of modified elliptical gears 10A, 10B are meshed so that the gears rotate about the gear centers 16A, 16B.

The gears are meshed in an initial 0° position in FIG. 1a. In the initial position, the major axis of the first paired gear 10A is coincident with a line 18 connecting the centers 16A, 16B of the two gears. The major axis 12B of the second paired gear is perpendicular to the center line 18. The orientations of the major axes 12A, 12B of the first and second gears switch every 90° of rotation.

To simplify the discussion of the invention, a set of exemplary modified elliptical gear parameters will be referred to throughout the specification. The exemplary parameters include a reference circular pitch diameter of 64 teeth per inch of circular diameter, a ratio of major to minor diameters of 1.54, 26 total teeth, a major pitch diameter of 0.4813 inch, and a minor pitch diameter of 0.3125 inch. These parameters will be discussed in detail below. It is to be understood that the above parameters are exemplary only and that other permutations of the parameters fall within the scope of this invention also.

The advantage of one aspect of the present invention is that the pair of modified elliptical gears 10A, 10B mesh snugly throughout a full rotation of the gears. In the initial position shown in FIG. 1a, the teeth 20A on the narrow end of the first paired gear 10A mesh snugly with the teeth 20B on the flatter side of the second paired gear 10B. As shown in FIG. 1b, the gears also mesh snugly at 40° rotation from the initial orientation.

The present modified elliptical shape of the gears 10A, 10B avoids the loose meshing by eliminating the gap that forms between meshed true elliptical gears. The gap forms four times during every full rotation of true elliptical gears, and is prominent in ranges around maximum values at 45°, 135°, 225°, and 315° rotation away from the initial position. The gap causes loose meshing by pulling the meshing teeth slightly apart.

For a pair of true elliptical gears having the exemplary parameters discussed above, the gap has a maximum size of about 0.011 inch. It is to be understood that the gap size varies directly with the diameters of the true elliptical gears, as long as the major to minor axis ratio remains the same.

The geometry of the modified elliptical gear 10A is based on a modified elliptical pitch shape 22A. The pitch shape 22A is illustrated by either of the dashed shapes 22A, 22B in FIG. 1a. The pitch shape 22A is defined by the imaginary shape on the modified elliptical gear 10A that rolls without slippage against the pitch shape 22B of a similar mating gear 10B. Thus, the pitch shape 22A ordinarily falls somewhere along the height of the gear teeth 20A.

Figure 4:
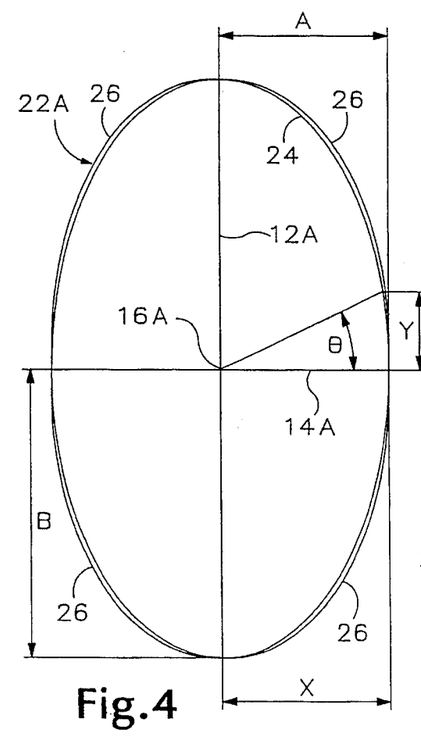
FIG. 4 is a modified elliptical shape used in accordance with an embodiment of the invention, showing bulged portions projecting from a true elliptical shape.

As shown in FIG. 4, the pitch shape 22A is based upon a true elliptical shape 24 that has major and minor axes 12A, 14A. Four thin, crescent-like bulged portions 26 are added to the true elliptical shape 24 at positions between the major and minor axes 12A, 14A. The bulged portions 26 fatten the elliptical shape 24 to yield the modified elliptical shape 22A.

With bulged portions 26 having a preferred thickness and shape, no gap will form between the meshed modified elliptical gears 10A, 10B. The modified elliptical pitch shape 22A preferably adds bulge functions ($|a_2 \sin^2 (2\theta)|$) to the shape of a true ellipse ($X = A \cos \theta$, and $Y = B \sin \theta$). Thus, the modified pitch shape 22A is defined by the equation $X = A \cos \theta + |a_2 \sin^2 (2\theta)| \cos \theta$, and $Y = B \sin \theta + |a_2 \sin^2 (2\theta)| \sin \theta$. As shown in FIG. 4, A is equal to the minor radius of the true ellipse, B is equal to the major radius of the true ellipse, $\theta$ is equal to the angle from the minor axis 14A, X is equal to the dimension from the major axis 12A to a point on the pitch shape 22A defined by $\theta$, and Y is equal to the dimension from the minor axis to the same point on the pitch shape. The functions $|a_2 \sin^2 (2\theta)|$ define the bulge portions 26, and $a_2$ is equal to what will be termed the "bulge factor."

For a modified elliptical gear with the above described exemplary parameters, an optimal bulge factor is around 0.0055 inch. The bulge reaches the 0.0055 inch maximum at the 45°, 135°, 225°, and 315° positions, and decreases on either side thereof to a zero bulge at the major and minor axis positions of 0°, 90°, 180°, and 270°. Such bulged portions 26 effectively eliminate the 0.011 inch gap between the true elliptical gears discussed above, to permit snug meshing throughout rotation of modified elliptical gears 10A, 10B.

The above equation for the modified elliptical pitch shape 22A works well with a range of major to minor diameter ratios. While the above equation is preferred, other equations may also produce workable modified elliptical pitch shapes. For instance, the related equation $X = A \cos \theta + |a_2 \sin (2\theta)| \cos \theta$, and $Y = B \sin \theta + |a_2 \sin (2\theta)| \sin \theta$ defines an alternative modified elliptical pitch shape that works well.

It is to be understood that the bulge factor should vary proportionally with a variation in ellipse major and minor diameters. For instance, if the size of the modified pitch shape is doubled, the bulge factor should double.

Further aspects of a gear of the present invention will be described relative to a method for making a modified elliptical gear 10A. The present invention preferably uses a computer-simulated hobbing process to define the shape of the modified elliptical gear 10A from the modified elliptical pitch shape 22A. The parameters of a circular gear (not shown) may be used as a "reference" in the present invention to set the pitch circumference and number of teeth of the modified elliptical gear 10A. Preferably, a whole number of teeth is chosen for a reference circular gear having a standard diametral pitch, such as 64 teeth per inch of circular gear diameter. The pitch circumference for the reference circular gear is calculated therefrom, and is used as the pitch circumference for the modified elliptical pitch shape 22A. For instance, the reference circular gear with a 64 diametral pitch and 26 teeth has a pitch circumference of about 1.28 inch. The number of teeth chosen for the reference circular gear is used for the modified elliptical gear 10A.

The hobbing rack (see FIG. 3) is chosen to have the same diametral pitch as the reference circular gear. A hobbing rack with a diametral pitch of 64 has about 64 /3.14=20.38 teeth/inch of rack length. The hobbing rack 30 has a row of truncated triangular shaped hobbing teeth 32 with straight side profiles 33 and flat tops 34. The hobbing teeth 32 are tightly spaced so that the roots 35 of adjacent teeth 32 abut one another. Thus, the gaps 31 between the straight-sided teeth 32 form a series of V-shapes.

Figure 5:
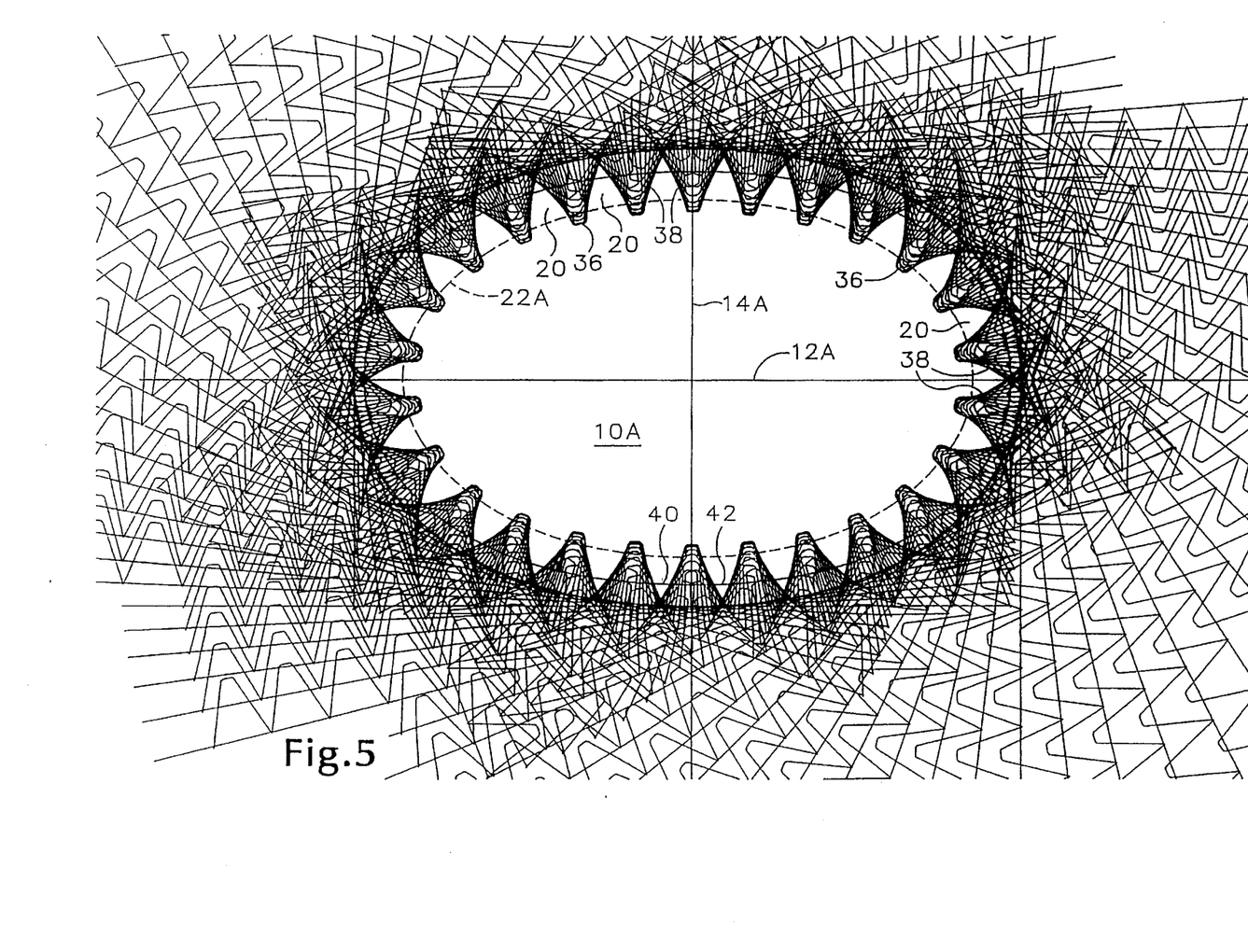
FIG. 5 is a computer-generated view of a simulated hobbing process in accordance with an aspect of the invention, showing traces of the hobbing rack in selected positions of rotation about the modified elliptical shape (shown in phantom) to create a profile of a modified elliptical gear.

FIG. 5 shows a computer-generated profile of the modified elliptical gear 10A generated by the simulated hobbing process. The modified elliptical pitch shape 22A is shown in phantom for illustrative purposes, and does not need to be drawn by the computer. The hobbing rack is inserted across the pitch shape 22A (to a uniform depth discussed below), and is rotated (rolled) around the pitch shape. The outline of the hobbing rack 30 is traced at intervaled angular positions during the rotation around the pitch shape 22A. In a preferred method, traces are made at every 5° of hobbing rack 30 rotation to define the profile of the modified elliptical gear 10A. Angular intervals can be varied to acquire desired resolution.

Figure 2A:
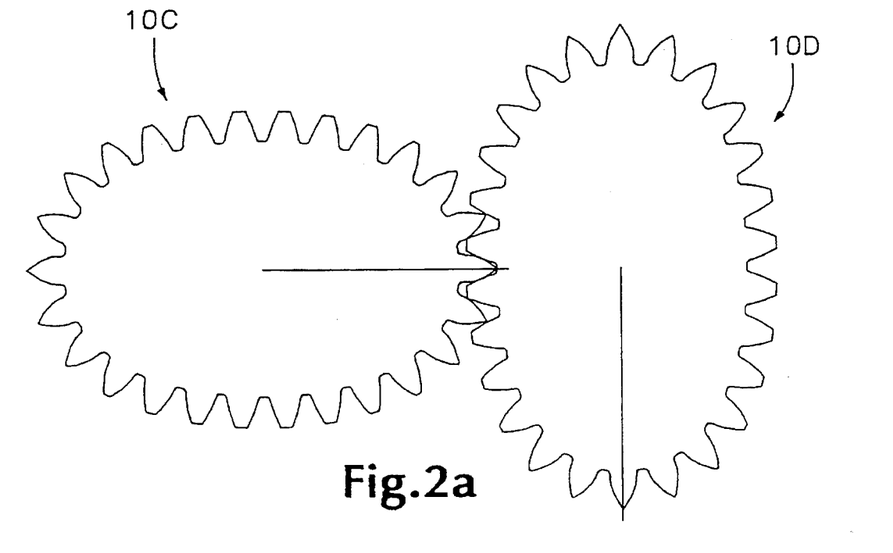
FIG. 2a is a computer-generated view of another meshed pair of modified elliptical gears in accordance with another embodiment of the invention, showing the meshing of the gears in a 0° initial position wherein the major axes of the gears are perpendicular.
Figure 2B:
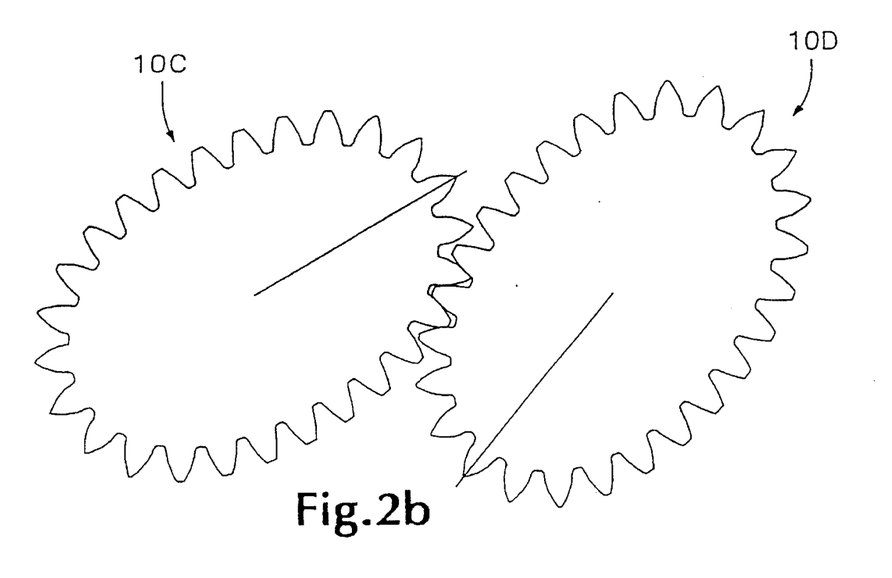
FIG. 2b is the meshed pair of modified elliptical gears of FIG. 2a, showing the snug meshing of the gears when the gears are rotated to a position 40° from the initial position.

The depth to which the hobbing rack 30 is inserted across the pitch shape 22A may be varied. In one preferred embodiment, the hobbing rack teeth 32 are inserted to an elevation across the pitch shape 22A where the hobbing teeth width is equal to the gap 31 between the hobbing teeth 32. Such an embodiment produces gears 10C, 10D that mesh snugly, as shown in FIGS. 2a and 2b. The preferred embodiment backs the hobbing rack 30 slightly outward from the above position so that the hobbing teeth 32 are inserted to an elevation where the hobbing teeth width is less than the gap 31 between the hobbing teeth 32. Such a hobbing rack "back-off" produces gear teeth 20A that are slightly thicker, as shown in FIGS. 1a, 1b, 5 and 6, to mesh very snugly with the teeth 20B of an identical modified elliptical gear 10B. For the above-discussed modified elliptical gear having a 64 diametral pitch, 26 teeth and a ratio of major to minor diameters equal to 1.54, the back off distance is preferably 0.005 inch.

As shown in FIG. 5, gear teeth 20A with involute shaped curved sides 38 are formed by the straight sides 33 of the hobbing teeth 32 as the hobbing rack 30 rotates around the pitch shape 22A. An involute curve is generally the curve traced by an imaginary string being unwound from a base shape. In the present case, the base shape may be a smaller scale version of the modified elliptical pitch shape. The flat tops 34 of the hobbing teeth 32 produce root surfaces 36 between the involute gear teeth 20A. The involute-shaped teeth 20A are desirable in that the involute is a recognized standard shape for gear teeth. Involute teeth mesh snugly with involute teeth on other gears.

While involute-shaped gear teeth are preferred, it is to be understood that other shapes of gear teeth may work as well. To modify the shape of the gear teeth 20A, the shape of the hobbing teeth 32 may be modified.

The shape of the traced involute gear teeth 20A vary from the major to the minor axes 12A, 14A. The gear teeth 20A on the flat sides of the pitch shape 22A adjacent the minor axis 14A conform closely to the shapes of the gaps 31 between the hobbing teeth 32. This conformance is due to the hobbing rack teeth 32 having little angular sweep as the hobbing rack 30 rotates across the flat sides of the pitch shape 22A. These gear teeth 20A are thicker measured circumferentially of the gear than the gear teeth adjacent the major axis 12A. The gear teeth 20A adjacent the minor axis are also relatively flat-sided and tall, having a height nearly equal to the height of the hobbing teeth 32.

On the other hand, the gear teeth 20A on the narrow ends of the modified elliptical pitch shape 22A (adjacent the major axis 12A) are relatively smaller and shorter, with more side curvature. These teeth 20A are smaller due to the hobbing teeth 32 having a relatively large angular sweep as the hobbing rack 30 rotates around the narrow ends of the pitch shape 22A.

The relatively tall gear teeth 20A are topped to avoid interference with the root surfaces 36 between the shorter teeth 20B on the narrow end of a meshed gear. To top the teeth, a modified elliptical topping shape 40 is superimposed onto the modified elliptical gear profile 10A generated by the simulated hobbing process (see FIG. 5). The topping shape 40 is a larger scale version of the pitch shape 22A, and has major and minor axes that are positioned coincident with the major and minor axes 12A, 14A of the pitch shape 22A. The topping shape 40 is scaled to define flat tops 42 on the taller gear teeth 20A in order to avoid interference as described above. In the gear 10A with the exemplary parameters described above, a preferred modified elliptical topping shape 40 has a major diameter of 0.54 inch.

It is to be understood that the topping shape could have another major diameter or be of a shape other than a modified ellipse. Any topping shape will work as long as the resulting gear teeth mesh snugly while not interfering with the roots of a meshed gear.

Figure 6:
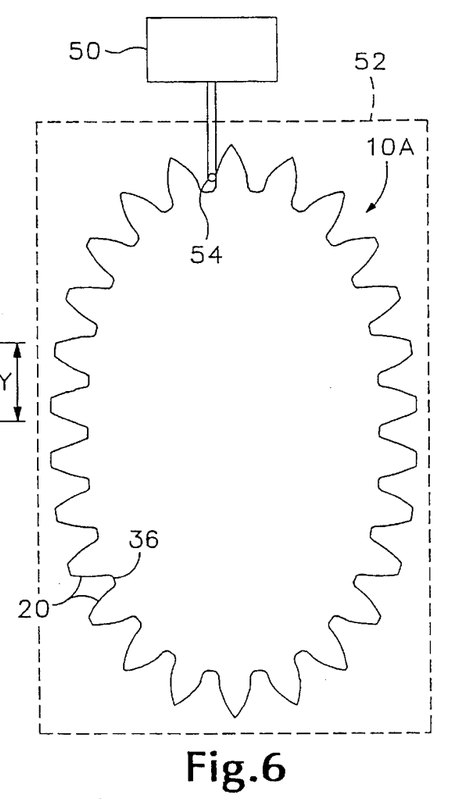
FIG. 6 is a computer-generated profile of the modified elliptical gear in accordance with an aspect of the invention, showing the profile of the modified elliptical gear of FIG. 5 with extraneous lines removed, and showing production of the modified elliptical gear from a gear blank in accordance with another aspect of the invention.
Figure 7A:
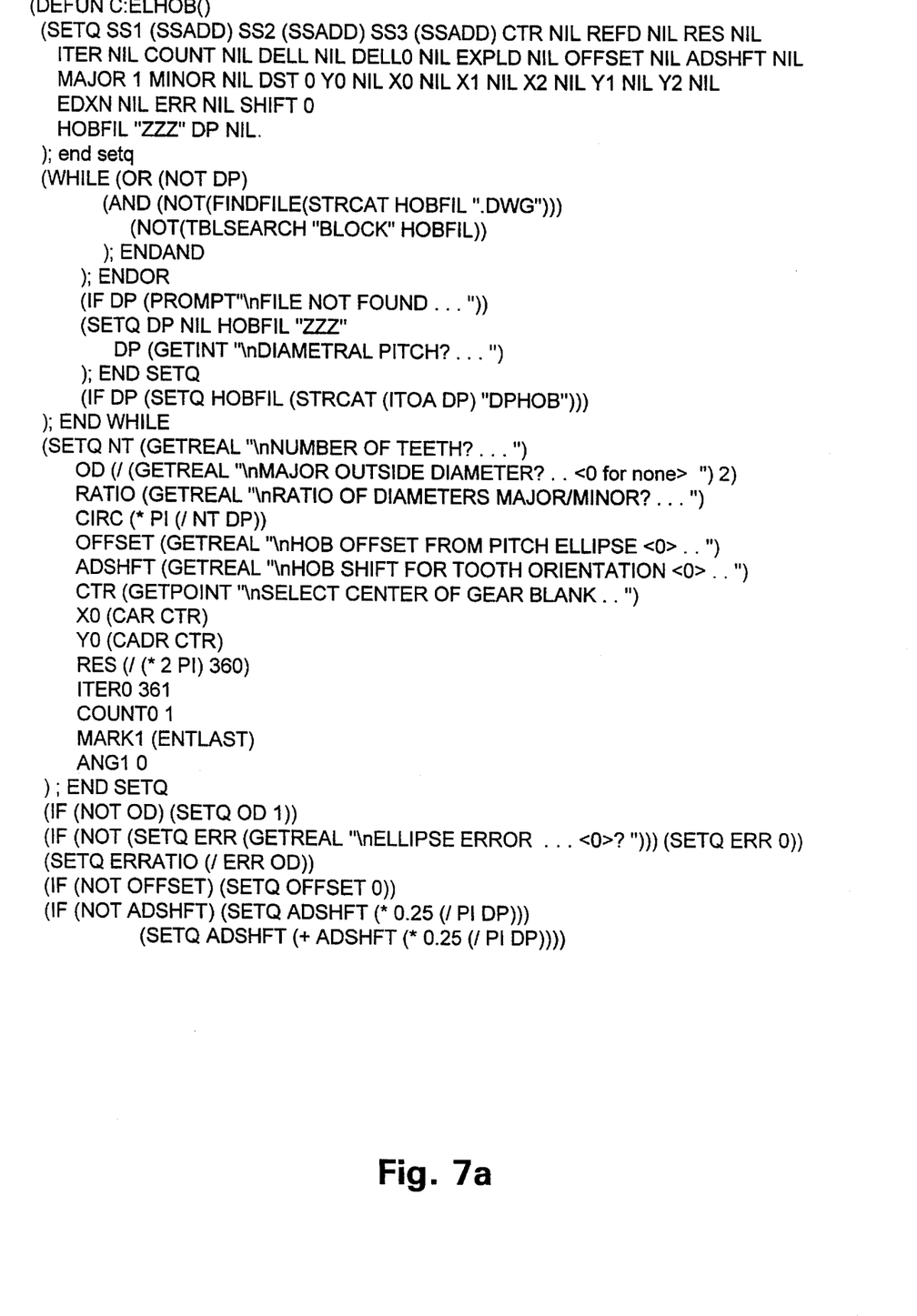
FIGS. 7A–7H provide the source code of a computer program "ELHOB.LSP" for carrying out a preferred method of the invention.
Figure 7B:
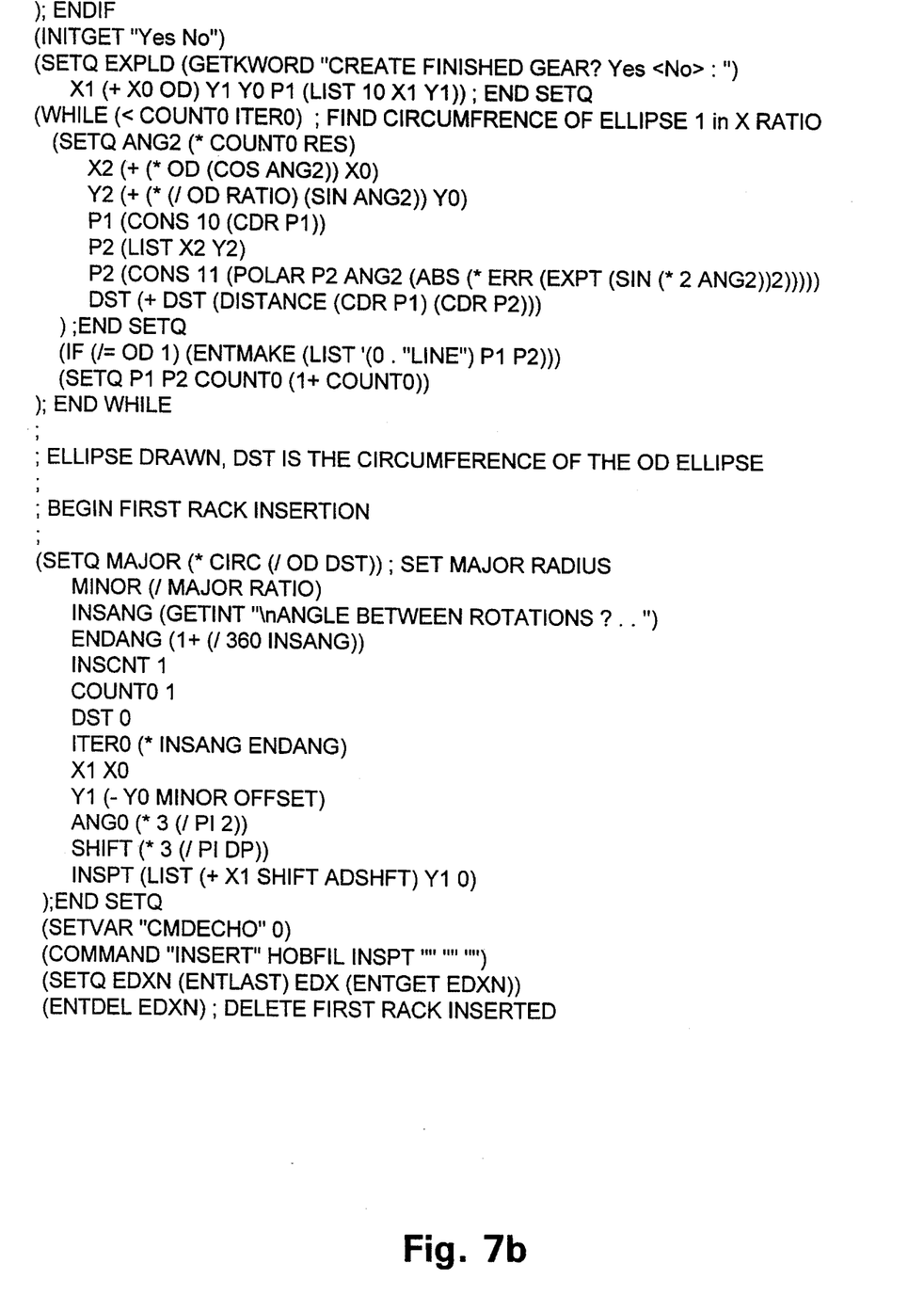
Figure 7C:
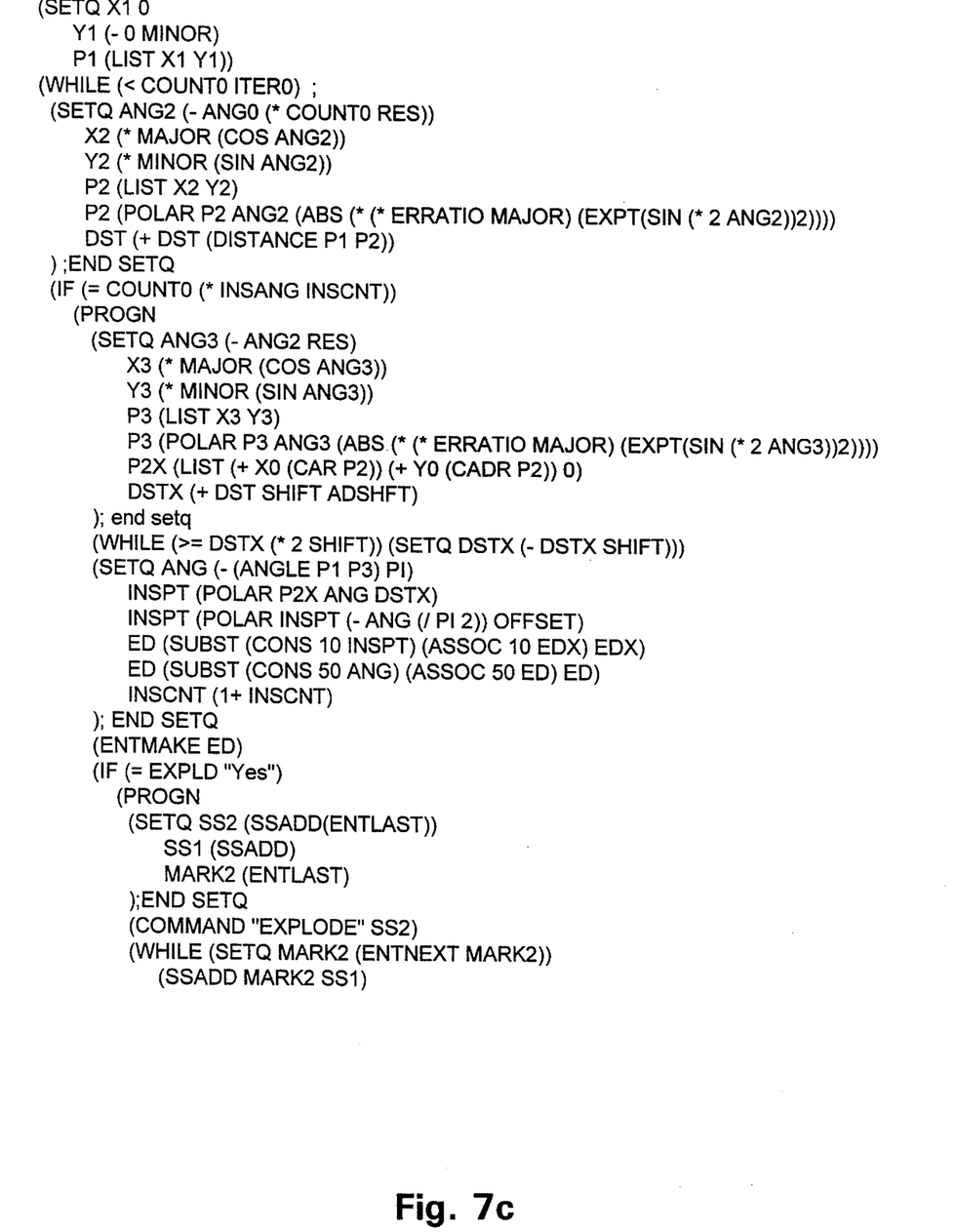
Figure 7D:
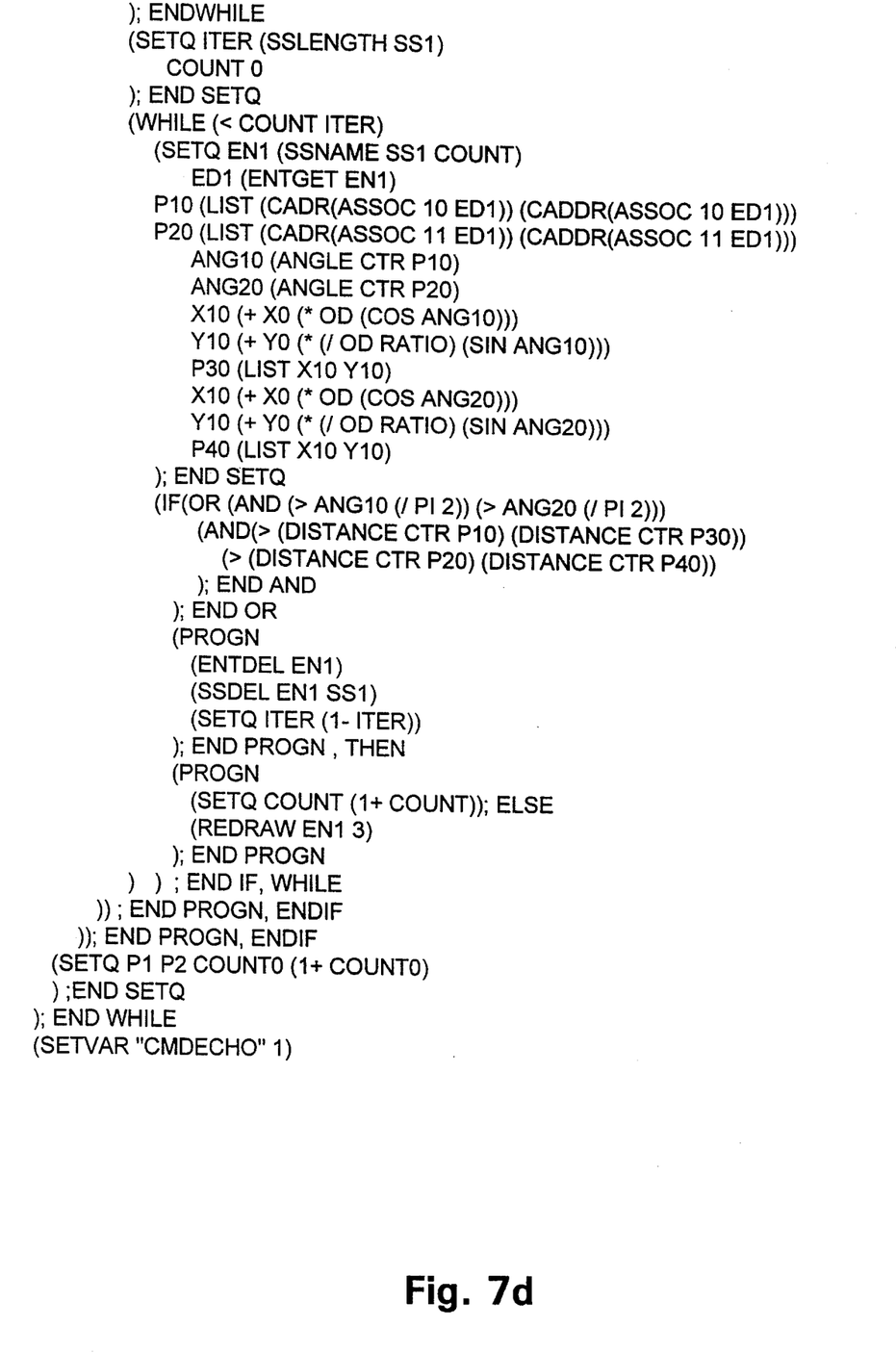
Figure 7E:
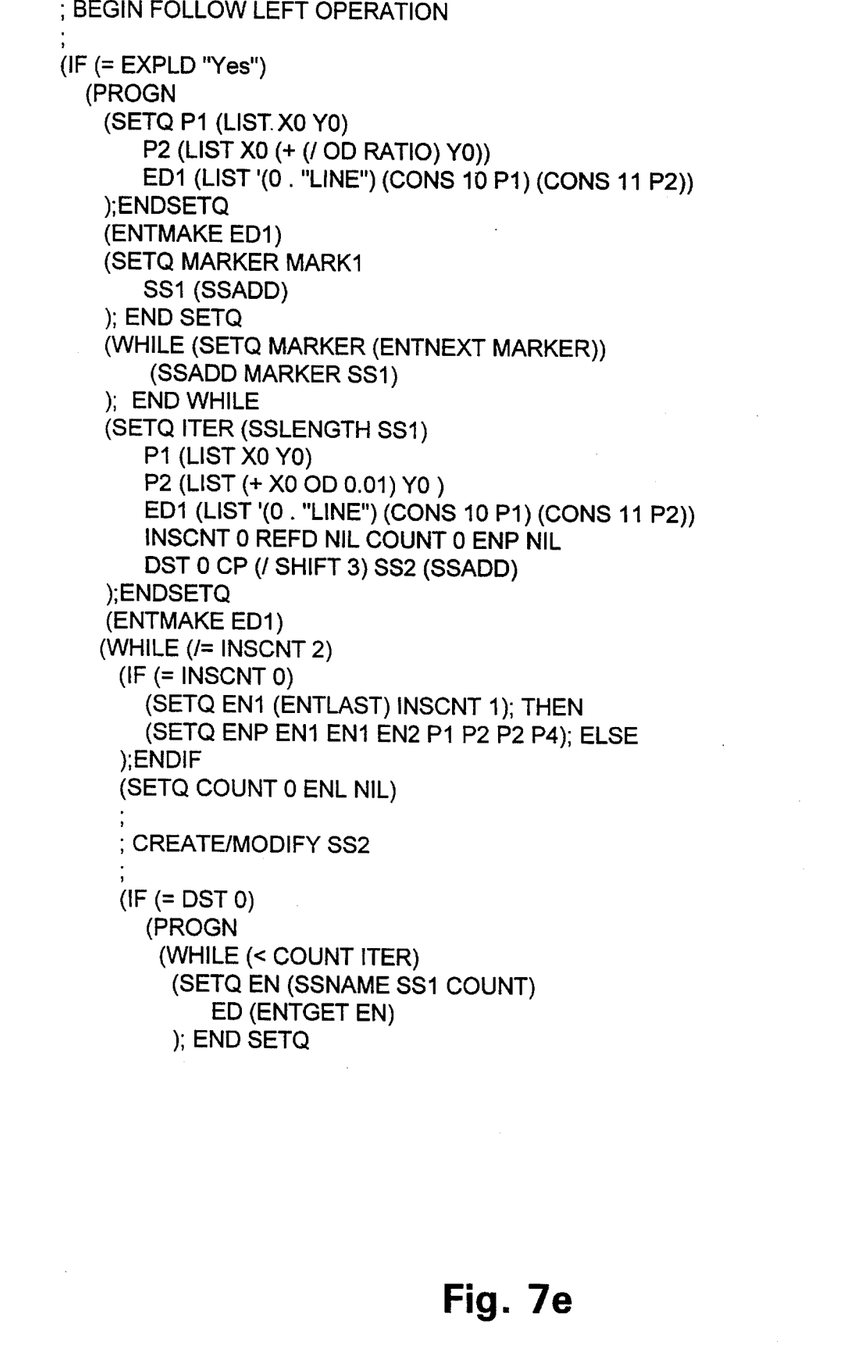
Figure 7F:
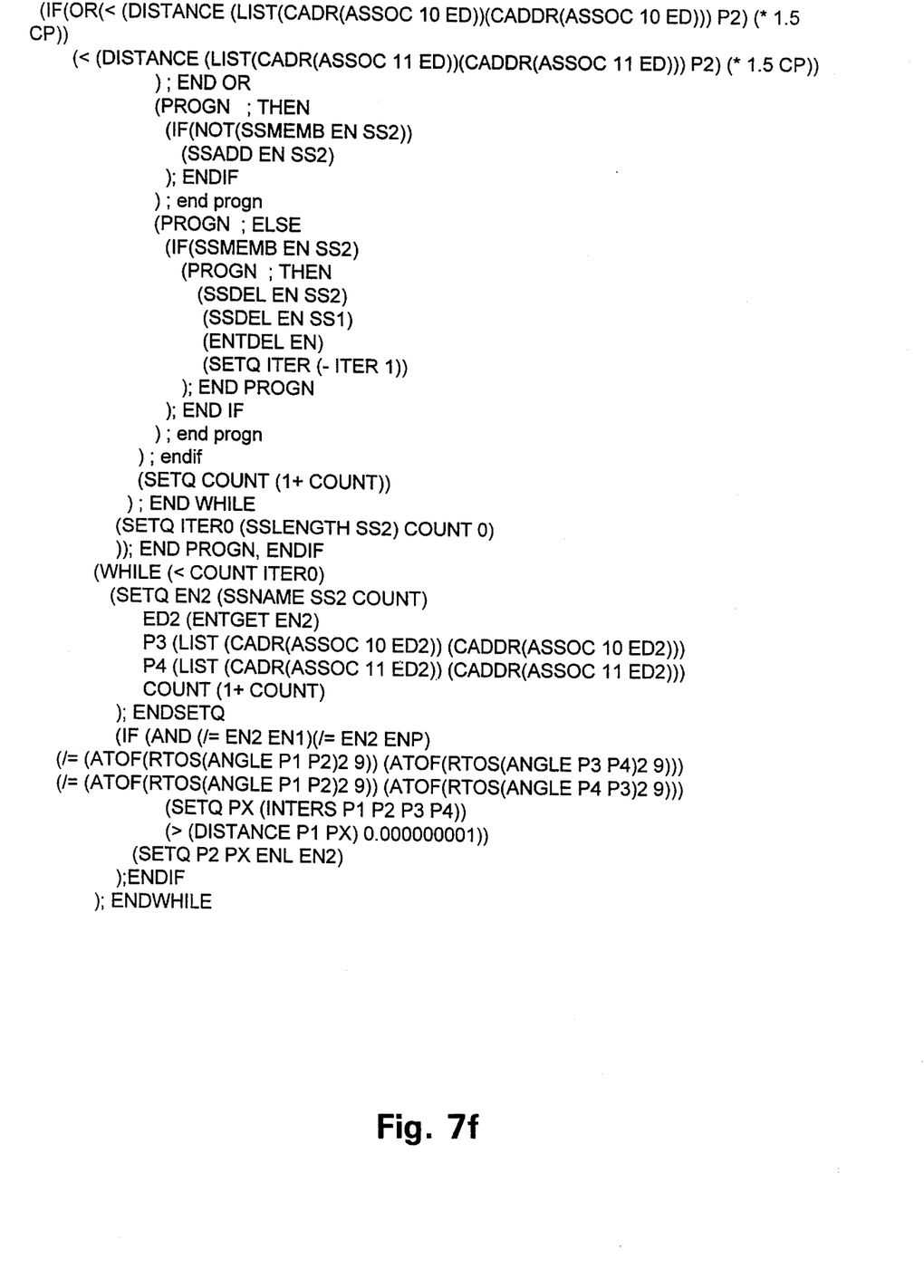
Figure 7G:
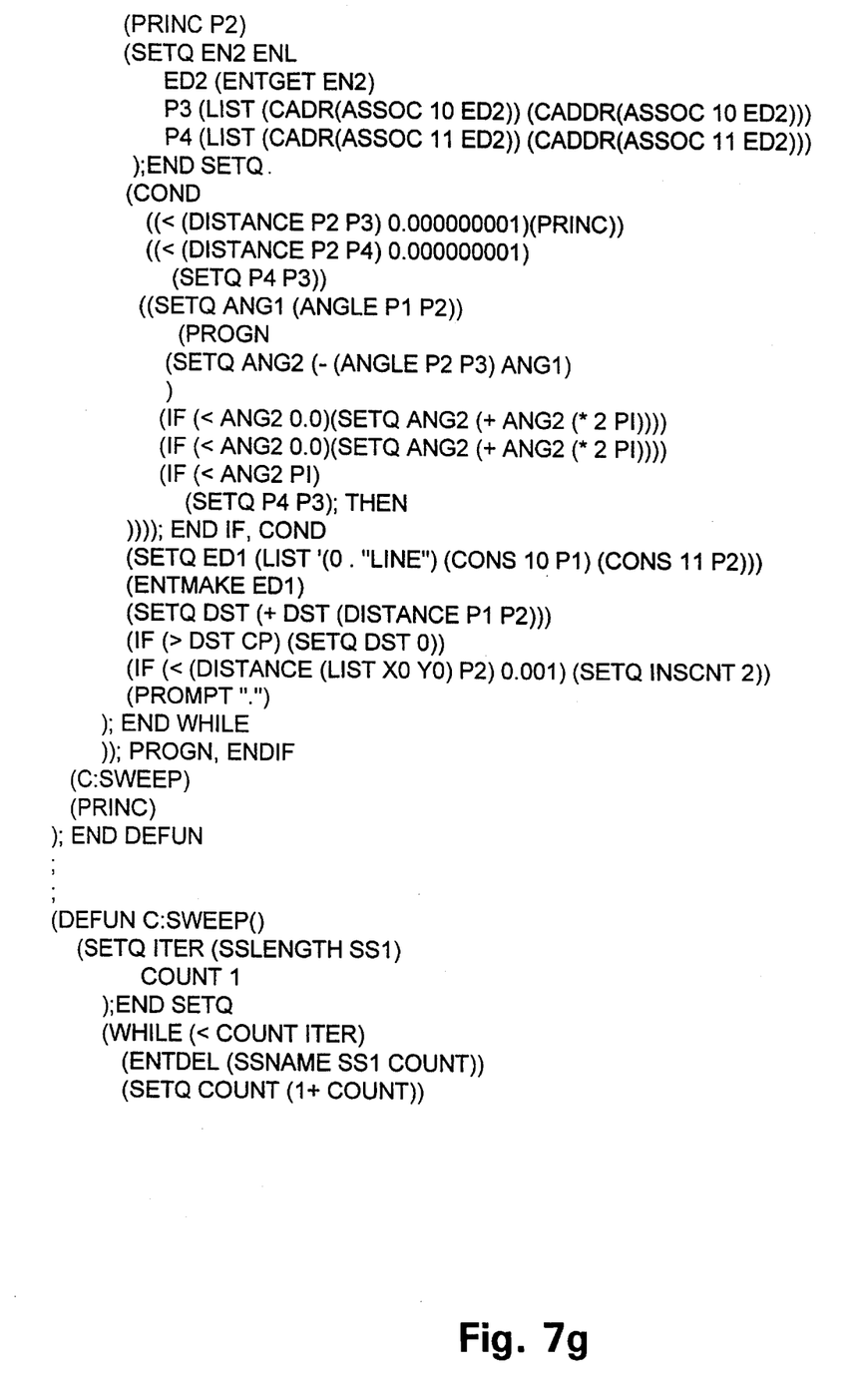
Figure 7H:
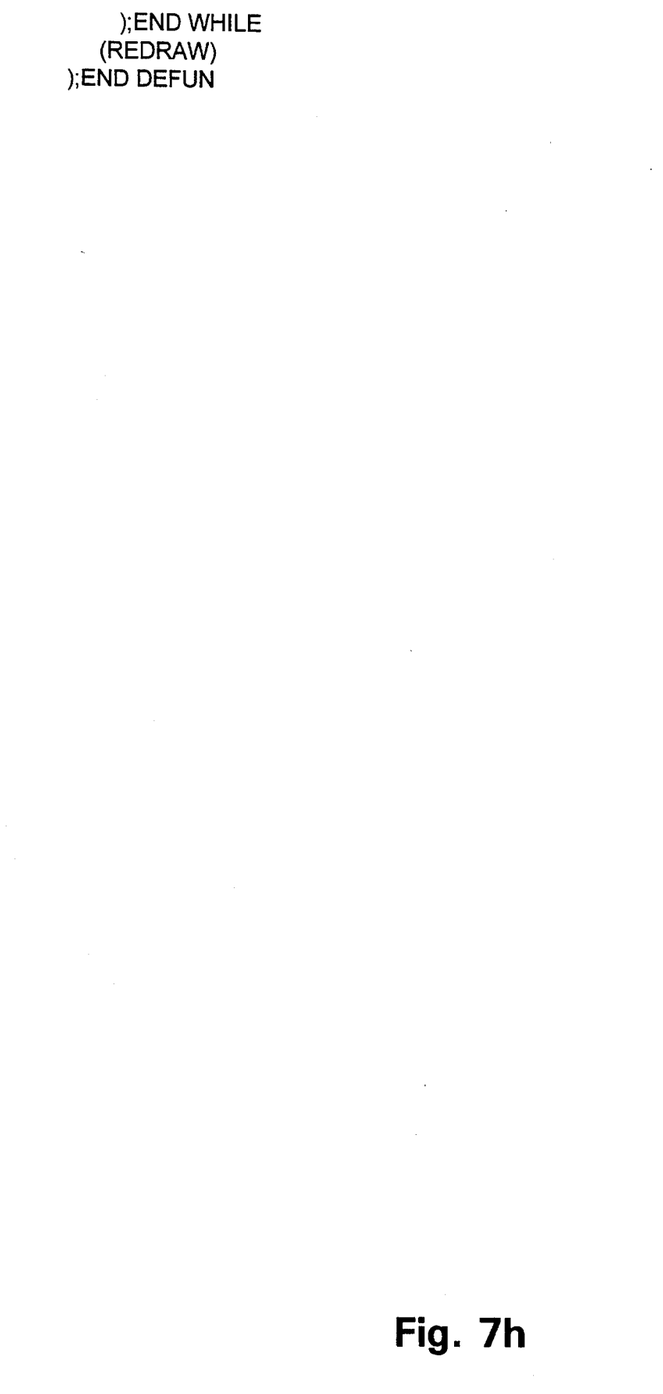

Once the modified elliptical gear contour 10A is hobbed and topped, points on the traced lines defining the shape of the modified elliptical gear 10A are marked. All of the lines traced during the hobbing and topping steps are then shed (deleted). Thus, the shedding operation yields points defining a single traced outline of the modified elliptical gear 10A, as shown in FIG. 6.

To mark the points, a "follow left" operation is preferably undertaken with the computer. Essentially, the follow left operation extends a line radially from the pitch shape center to an intersection with any traced line created by the hobbing or topping steps of FIG. 5. That intersection point is marked, and the intersecting line is followed toward the left to a second intersection with the next intersecting line. The second intersection point is marked, and the line with the minimum leftward angle relative to the incoming line is followed to the next intersection point at the next intersecting line. This intersection point is also marked, and again the line with the minimum leftward angle from the incoming line is followed. Continuing in this manner, the lines defining the contour of the modified elliptical gear 10A are followed around the gear. By marking each intersection point, a series of points is formed which form a point-to-point profile. If required for the operation of a machining means (discussed below), the points may be connected to obtain the modified elliptical gear profile 10A shown in FIG. 6. All of the extra lines traced during the hobbing and topping steps are deleted.

While the above shedding operation is preferred, it is to be understood that any method that produces the single profile of the modified elliptical gear 10A will work equally as well.

The modified elliptical gear profile 10A may be input into a machine 50 operable to produce a part with the gear shape such as a numerically controlled wire electric discharge machine (EDM) that cuts the modified elliptical gear 10A out of a gear blank 52 (shown in dashed lines). In general, the EDM uses a brass or copper wire 54 which is of opposite electrical polarization from the gear blank. The wire is fed from the EDM toward the gear blank to create an electrical arc between the wire and the gear blank. The arc erodes the gear blank to create the modified elliptical gear.

The EDM may be operated either to produce an actual gear or it may produce a form having a gear-shaped cavity within which a gear may be cast.

The gear profile 10A may be input into the EDM in a variety of ways. For instance, point-to-point data on a floppy disk may be entered into a computer numerical control (CNC) attending the EDM. Alternatively, the profile points may be connected by a profile line as shown in FIG. 6, and the profile input into the EDM via a standard ".dxf" drawing file. The computer numerical control (CNC) stores the profile data and controls the EDM to cut the gear.

A preferred model of EDM is the EPOC-300 EDM made by Sodic, equipped with a Mark 6-Silver Series numerical control. It is to be understood, however, that a variety of EDMs, or other types of gear-cutting machines, may be used to produce the modified elliptical gear.

The simulated hobbing and topping processes of the present invention are preferably carried out on an AUTOCAD™ computer system. The preferred software is AUTODESK™ software manufactured by AUTOCAD™, and the hobbing and topping programs are written in the AUTOLISP™ computer language. While the aforementioned computer system, software and language are preferred, it is to be understood that a variety of other computer systems, software and languages may be used with equally good results.

The source code for a program conducting the hobbing, topping, and shedding operations is attached as FIGS. 7A–7H. The program "ELHOB.LSP" prompts a user for a reference circular diametrical pitch, a number of teeth for the modified elliptical gear, a ratio of major and minor diameters for the modified elliptical gear, and a dimension for the bulge factor (ellipse error).

As described above, the computer calculates the circumference for the reference circular gear using the input circular diametrical pitch and the number of teeth. The modified elliptical pitch shape 22A for the gear is calculated from the circumference, major to minor diameter ratio, the bulge factor, and the equation for the modified elliptical shape.

Figure 3:
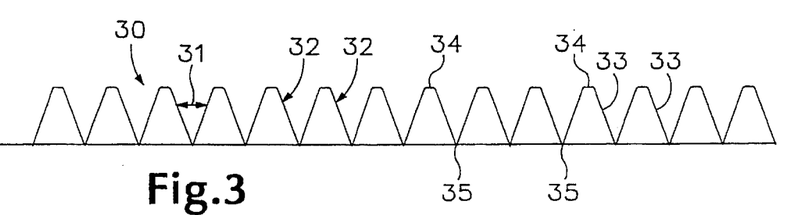
FIG. 3 is a profile of a simulated hobbing rack used in accordance with an embodiment of the invention.

Based upon the diametral pitch input, an appropriate hobbing rack 30 is retrieved. Hobbing rack profiles, such as shown in FIG. 3, are stored in conventional drawing files for retrieval by the program.

The program also prompts the user for a major outside diameter for the topping shape 40, the hob offset from the pitch shape 22A, and the rotation angle between tracings of the hob rack 30, all of which are described above. The computer generates the profile of the modified elliptical gear based upon the traces of the hobbing rack 30, and the topping shape 40. The shedding operation is then undertaken to output the single profile of the modified elliptical gear 10A as shown in FIG. 6.

It is to be understood that the above-described method may be varied with equally good results. For instance, the computer topping operation can be dispensed with by cutting the gear with untopped gear teeth, and thereafter mechanically topping the gear teeth.

Furthermore, the modified elliptical pitch shape 22A may be calculated in a variety of ways. For example, if a particular major or minor diameter is preferred, the other parameters can be appropriately selected to produce a gear with the preferred diameter. Any size modified elliptical pitch shape 22A will work as long as the hobbing rack 30 produces a whole number of gear teeth 20A along the pitch shape circumference.

The foregoing has been described in connection with preferred and alternative embodiments. It will be appreciated by one of ordinary skill in the art, however, that various modifications and variations may be substituted for the methods and mechanisms described herein while remaining defined by the appended claims and their equivalents.

I claim:

1. A method for making a gear, comprising the steps of:
   providing a modified elliptical shape having perpendicularly disposed major and minor axes and bulged portions projecting outwardly beyond the contour of a true elliptical shape in peripheral regions between the major and minor axes;
   rotating a simulated hobbing rack about the modified elliptical shape;
   tracing the outline of the simulated hobbing rack at selected positions during the rotation around the modified elliptical shape, the tracings defining the shape of a modified elliptical gear with projecting gear teeth; and
   producing the modified elliptical gear using the shape of the modified elliptical gear defined by the tracing step.

2. The method according to claim 1, including the step of superimposing a modified elliptical topping shape over the gear shape, the topping shape being a larger scale version of the modified elliptical shape having major and minor topping shape axes, the topping shape being positioned so that the axes of the topping shape and the modified elliptical shape coincide, the topping shape acting to effectively remove top portions of selected gear teeth.

3. The method according to claim 2, wherein the topping step includes topping the teeth adjacent the minor axis of the modified elliptical shape.

4. The method according to claim 1, wherein the simulated hobbing rack includes a plurality of simulated hobbing teeth.

5. The method according to claim 4, wherein the simulated hobbing teeth are in the shape of truncated triangles and are operable to define involute shaped gear teeth, with the gear teeth adjacent the minor axis having a greater thickness measured circumferentially of the gear teeth than the gear teeth adjacent the major axis.

6. The method according to claim 4, wherein the modified elliptical shape defines a pitch shape for the gear.

7. The method according to claim 6, wherein the step of rotating the hobbing rack includes positioning the hobbing rack so that the hobbing teeth intersect the pitch shape.

8. The method according to claim 7, wherein the hobbing rack intersects the pitch shape at a position along the height of the hobbing teeth where the thickness of the hobbing teeth is equal to the thickness between the hobbing teeth.

9. The method according to claim 7, wherein the hobbing rack intersects the pitch shape at a position along the height of the hobbing teeth where the thickness of the hobbing teeth is less than the thickness between the hobbing teeth.

10. The method according to claim 9, wherein the machining means is a wire electric discharge machine.

11. The method according to claim 1, wherein the modified elliptical shape is defined by the equation
$X = A \cos\theta + |a_2 \sin^2(2\theta)| \cos\theta$, and
$Y = B \sin\theta + |a_2 \sin^2(2\theta)| \sin\theta$, where $A$ is the maximum radial length of the shape along the minor axis, $B$ is the maximum radial length of the shape along the major axis, $\theta$ is the angle from the major axis, $X$ is the dimension from the major axis to a point on the modified elliptical shape defined by the angle $\theta$, $Y$ is the dimension from the minor axis to the point, and $a_2$ is a predetermined bulge factor.

12. The method according to claim 1, which further includes the step wherein the shape of the modified elliptical gear is input into a machining means operable to produce the modified elliptical gear.

13. The method according to claim 12, wherein an image of the shape of the modified elliptical gear is input into the machining means.

14. The method according to claim 12, wherein point-to-point data defining the shape of the modified elliptical gear is input into the machining means.

15. The method according to claim 1, including the step of setting the circumference of the modified elliptical shape equal to the circumference of a reference circular gear.

16. A method for making a gear, comprising the steps of:
   selecting a modified elliptical pitch shape having perpendicularly disposed major and minor axes and bulged portions projecting outwardly beyond the contour of a true elliptical shape in peripheral regions between the major and minor axes;
   rotating a simulated hobbing rack having a plurality of simulated involute teeth around the pitch shape, the rotation being such that the simulated hobbing rack teeth intersect the pitch shape;

tracing the outline of the simulated hobbing rack at selected positions during the rotation around the pitch shape, the tracings together defining a shape of a modified elliptical gear with projecting involute gear teeth;

superimposing a trace of a modified elliptical topping shape over the gear shape, the topping shape being a larger scale version of the pitch shape having major and minor topping shape axes, the axes of the topping shape and the pitch shape coinciding so that the topping shape tops the gear teeth adjacent the minor axis of the topping shape to further define the shape of the modified elliptical gear;

determining locations on the traced shapes that together define the shape of the modified elliptical gear;

inputting the locations into a machining means operable to produce the modified elliptical gear; and producing the modified elliptical gear from a gear blank using the locations defining the modified elliptical gear that are input into the machining means.

* * * * *